March 6, 1928.  J. W. DERRICK  1,661,882

VEHICLE JACK

Filed Oct. 30, 1926

James W. Derrick
INVENTOR

BY Victor J. Evans
ATTORNEY

Walter Chism
WITNESS:

Patented Mar. 6, 1928.

1,661,882

UNITED STATES PATENT OFFICE.

JAMES W. DERRICK, OF PHILADELPHIA, PENNSYLVANIA.

VEHICLE JACK.

Application filed October 30, 1926. Serial No. 145,285.

This invention relates to vehicle jacks and more particularly to an adjustably fixed jack, which is adapted to be set in an inclined axle engaging position under a vehicle axle and lift one end thereof, by running the vehicle over and onto the jack.

The principal object of the invention is to provide a jack which will raise a vehicle at one of its front or rear axle end portions, by running the vehicle over the jack and which further provides adjustable wedge means to provide traction surface for the rear wheel on that portion of the axle which is to be raised, and thereby prevent the spinning of the wheel after it is clear of the floor surface due to the conventional differential construction contained in a rear axle for a vehicle, and maintain the uninterrupted power application on both of the rear driving wheels simultaneously.

A further object of the invention is to provide a vehicle jack as specified, which is further adapted for raising either a front or rear wheel on either side of a vehicle, and with follow-up stop means associated with the jack base for arresting the return movement of the jack at any point between the extreme inclined position of the jack and the perpendicular position thereof.

A further object of the invention is to provide a vehicle jack as specified, having a reversible inclined block or wedge associated therewith in interchangable co-operative relation with the base of said jack, and adjustably and detachably carried thereby, for lateral and longitudinal adjustment thereof in spaced relation to the jack and in central alignment with a vehicle wheel, to provide traction surface therefor during its rotating movement from a ground contact to a raised position and out of contact with a ground surface.

Other objects of the invention will appear in the following detail description, and in the accompanying drawings, wherein.

Figure 2:
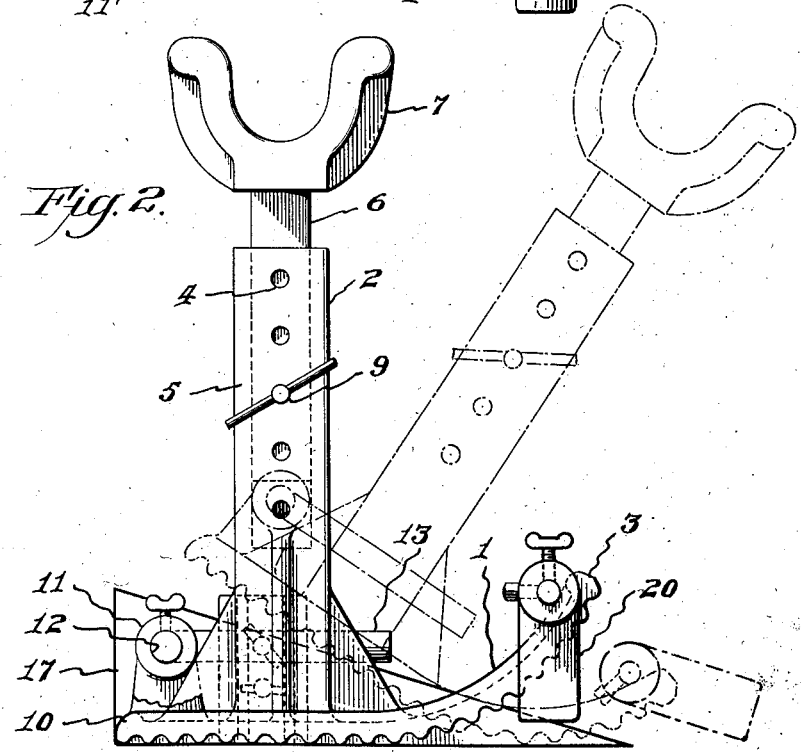
Figure 2 is a side elevational view of the same, with a dotted line illustration of the jack in its inclined axle engaging position and the co-operative relation of the wedge block and follow-up stop members associated therewith.

Referring more particularly to the drawing, the improved vehicle jack comprises a base 1, with an upstanding tubular standard 2, formed integrally therewith, centrally and adjacent the rear heel of the base 1. Said base being further provided with an upwardly curved front end 3, and with the bottom surface of said base transversely grooved or corrugated as clearly shown in Figure 2, of the drawing, to provide a non-slipping ground contact surface.

The tubular standard 2, is provided with a plurality of spaced transversely extended openings 4, through the side walls 5, of the standard 2, in axial alignment. Said standard adapted to receive a tongue 6, having an axle engaging saddle block 7, formed integrally therewith at its upper end. Said tongue 6, being similarly provided with a plurality of spaced transverse openings which are adapted to register individually, with any one of the openings 4, to receive a suitable pin bolt 9, therethrough, to secure the tongue 6, in the standard 2, in adjusted height relation thereto. Said saddle block 7, provided with a substantially semi-circular recess which is adapted to loosely engage and receive the periphery of the well known axle housing (not shown) therein.

The base 1, forming an integral part of the jack is also provided on its opposite sides and at the rear end 10, thereof, with a pair of oppositely disposed upstanding lugs 11, having transverse openings 12, therein, with said openings in axial alignment. Said lugs 11, adapted to receive separately by means of the said openings, either end of a right angularly formed rod 13, and adapted to be adjustably held in said openings by means of a suitable thumb screw carried by each of said lugs.

Figure 1:
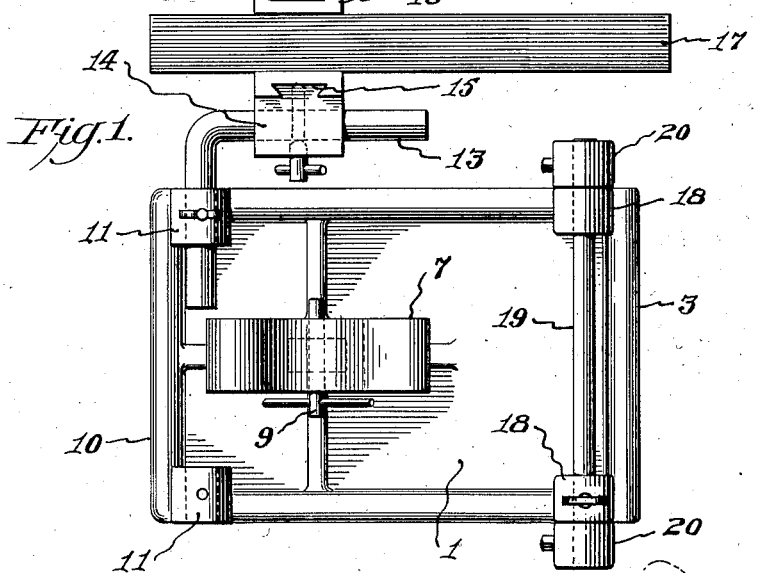
Figure 1 is a top plan view of the complete vehicle jack in a vertical position prior to placement thereof against the axle of a vehicle in an inclined position.

The free end of said rod 13, extends forwardly and in spaced parallel relation to the side of the base 1, to which it is attached, and adapted to slidably receive thereon a wedge connecting block 14, having a male dove-tail projection formed on its outer side as indicated at 15, and said male dove-tail adapted to fit in a female dove-tail slot 16, formed integrally with and on each side of an inclined block or wedge 17, intermediate its ends, as clearly shown in Fig. 1, of the drawing.

Upon further examination of Figure 1, of the drawing, it will be observed that the rod 13, is adapted to have either end thereof inserted in either one of the lugs 11, for pivotal connection therewith, and that the block 14, is also adapted to be reversed on either end of the rod 13, for receiving the opposite female dove-tail slot 16, carried by the wedge block 17, when it is desired to place the wedge on the opposite side of the base 1. This arrangement of detachably connecting a wedge block to either side of the jack, provides for the perfect operation of the device on either front or rear wheel of a vehicle which may require changing of a tire and rim carried thereby.

The upwardly curved front end 3, of the base 1, is similarly provided on its sides with a pair of oppositely disposed upstanding lugs 18, having transverse openings therein and said openings in axial alignment, for pivotally receiving a shaft 19, and with a follow-up member 20, fixedly secured on each laterally projected free end of the shaft 19, as clearly shown in Figure 1, of the drawing. Said follow-up members 20, adapted to drop into a depending position and into contact with a ground surface, upon the movement of the entire jack structure from an inclined to a full or partial vertical position.

The provision of the pivoted follow-up members 20, precludes the necessity of replacing the jack in position against a vehicle axle, should the motor of the vehicle "stall" during the forward or rearward movement thereof, with the jack in only a half or part way position from the maximum inclined, to the full vertical position.

After a tire has been replaced, or other repairs effected on a vehicle wheel which has been raised for the purpose, and it is desired to remove the jack, the position of the follow-up members 20, is reversed from a depending to an upstanding position, and held therein by means of a suitable thumb screw disposed in one of the lugs 18, and binding on one end portion of the shaft 19, whereupon the vehicle may be rocked or moved forwardly under its own power, to urge it over the center of the jack, until the jack is substantially free from the vehicle axle and in its original full inclined position.

Having thus described my invention, what I claim is:

1. A vehicle jack comprising a standard adapted to support a vehicle including a flanged base having its front end portion curved upwardly, adjustable vehicle wheel traction means pivoted to said flanged base in spaced co-operative relation thereto, and stop means carried by said base and pivoted to the said upwardly curved end thereof and designed to engage with the floor or ground for arresting the rocking movement of said jack at any point between the inclined and normal vertical vehicle supporting position thereof.

2. A vehicle jack comprising a standard adapted to support a vehicle including a flanged base having its front end portion curved upwardly whereby said jack may be moved together with said vehicle, adjustable vehicle wheel traction means pivotally carried by said flanged base parallel therewith and in spaced co-operative relation thereto, said traction means adapted to be moved into contact position and in central alignment with a wheel carried by said vehicle independently of said supporting jack and adapted to provide an inclined traction surface for said wheel upon the elevation thereof from a given surface by moving said vehicle over and on the standard comprising said jack.

3. A vehicle jack comprising an adjustably fixed standard including a flanged base therefor having its front end portion curved upwardly whereby said jack may be moved together with said vehicle, adjustable vehicle wheel traction means pivotally carried by said base parallel with and in spaced co-operative relation thereto, said traction means adapted to be moved into contact position with and in central alignment with a wheel carried by said vehicle independently of said supporting jack and adapted to provide an inclined traction surface for said wheel upon the elevating thereof from a given surface by moving said vehicle over and on the standard comprising said jack, and follow-up means pivotally carried by said base at the upwardly curved front portion thereof for arresting a return movement of said jack at any point between the inclined and normal vertical supporting position.

4. A vehicle jack comprising an adjustably fixed standard including a flanged base therefor having its front end portion curved upwardly whereby said jack may be moved together with a vehicle, adjustable vehicle wheel traction means pivotally carried by said base parallel therewith in spaced co-operative relation, said traction means adapted to be moved into contact position with and in central alignment with a wheel carried by said vehicle independently of and after said jack has been positioned under said vehicle, said means adapted to provide an inclined traction surface for said wheel upon the elevating thereof from a given surface by moving said vehicle over and on the standard comprising said jack, said traction means interchangeable relative to the position of said standard and base for elevating a wheel on either the right or left side of said vehicle.

In testimony whereof I affix my signature.

JAMES W. DERRICK.